Patented Oct. 18, 1949

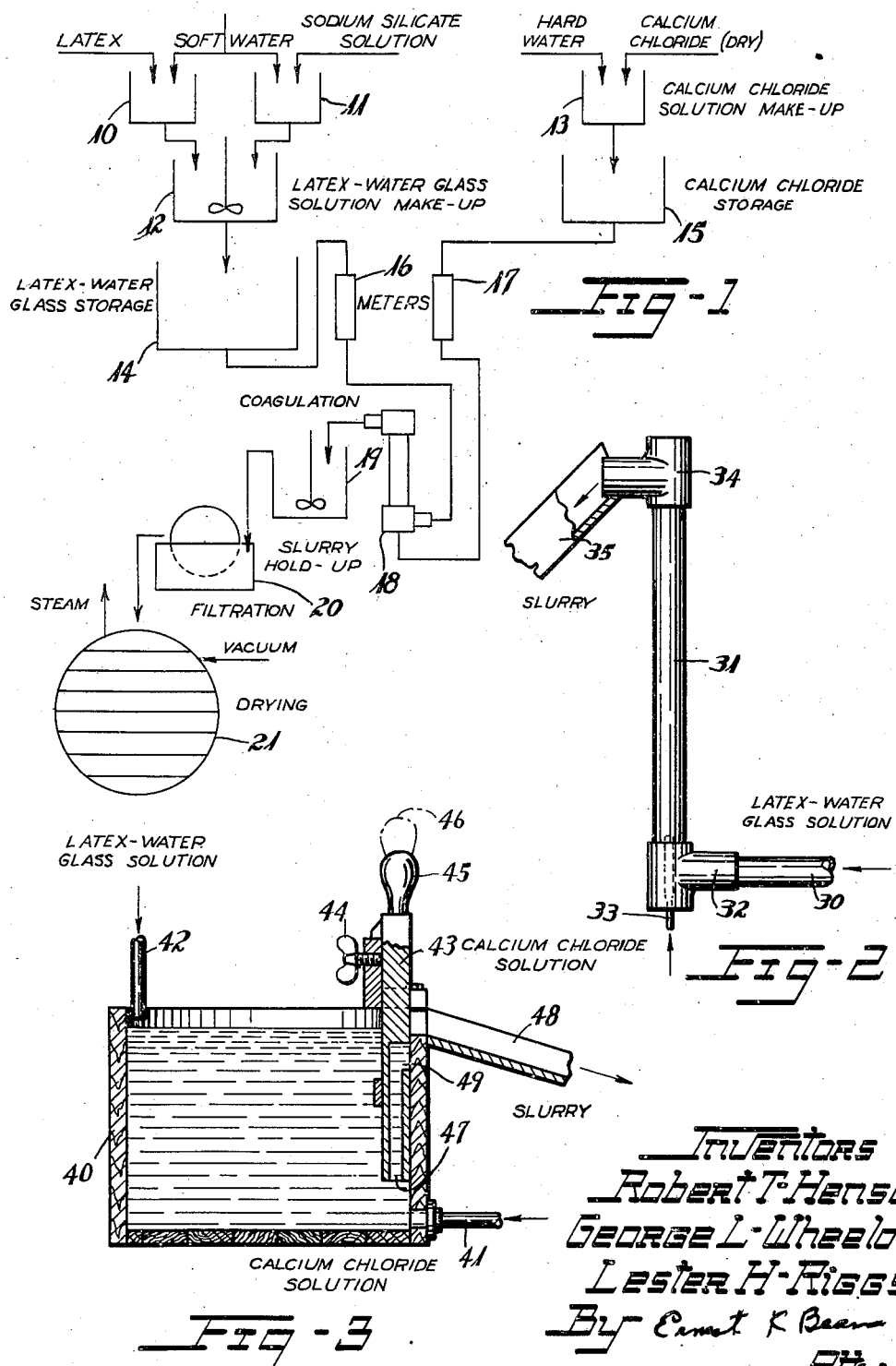

2,485,287

UNITED STATES PATENT OFFICE

2,485,287

METHOD OF ASSOCIATING PLASTIC MATERIALS AND COMPOUNDING INGREDIENTS

Robert T. Henson and George L. Wheelock, Akron, Ohio, and Lester H. Riggs, Maywood, Ill., assignors to The B. F. Goodrich Company, New York, N. Y., a corporation of New York Application November 6, 1946, Serial No. 708,166

7 Claims. (Cl. 260—41)

This invention relates to plastic compositions comprising a plastic material in intimate association with a compounding material. The invention more particularly relates to an improved method by means of which plastic materials and compounding ingredients may be brought in closer and more intimate contact and new and improved properties may be imparted to said plastic materials.

It is well known that in the compounding of rubber, either natural or synthetic, and in the compounding of the other well-known plastic materials including many vinyl resins, acrylate polymers, and the like, that it is generally desirable to admix the plastic material with finely-divided or powdered substances, known to the art as compounding ingredients or pigments, which are dispersible in the plastic material by ordinary mixing procedures, and which combine physically therewith to produce a plastic composition superior in strength, tenacity, chemical and physical stability, wear resistance and other properties, to the plastic material alone.

However, certain of the compounding ingredients are dispersible into rubber and other plastic materials with considerable difficulty, due either to the extreme fineness of the compounding material itself, to the inherent toughness of the plastic material, or to the difficulty in obtaining wetting of the finely-divided pigments by the plastic material. Moreover, many well-known compounding ingredients are in an extremely fine state of division, which causes them to be carried into the air during mixing operations where, due to their disagreeable odor or taste, they are highly obnoxious and irritating to workers and other in the vicinity.

Accordingly, it is an object of this invention to provide an improved method of preparing plastic compositions containing compounding ingredients, which method will be simpler and cleaner in operation, and which will produce plastic compositions of new and improved properties.

It is another object of this invention to provide a continuous method of associating plastic materials with compounding materials.

It is a further object of this invention to provide a continuous method of associating plastic materials with normally dry and powdery compounding materials, whereby such materials are brought into more uniform and intimate association with the plastic material, and whereby new and improved properties are imparted to the plastic materials.

It is a still further object of this invention to provide a method of dispersing normally dry and powdery compounding ingredients in plastic materials, whereby the conventional dry-mixing steps of the conventional art are eliminated, and a higher and more uniform degree of dispersion is secured.

These objects are attained by the method of this invention in which a water-insoluble compounding ingredient, which may be an organic salt such as calcium silicate, lead silicate or the like, or an organic salt such as is often used in rubber compounding as an age resistor, vulcanization accelerator or activator, or the like, and which normally is dry and powdery, is associated with, or incorporated in, a plastic material by co-precipitation of said plastic and said compounding ingredient in aqueous media. In particular, the method of this invention comprises the association of a coagulable aqueous dispersion of an organic plastic material, such as a natural or synthetic rubber or resin latex, with an aqueous solution of a water-soluble reagent which is one component from which the compounding ingredient may be produced by chemical reaction, and with an aqueous solution of a second water-soluble reagent reactive with the first reagent to form the compounding ingredient, in a manner such that the various reactants remain in substantially distinct layers or moving streams while permitting diffusional intermingling of the separate reactants, thereby to effect reaction of the water-soluble chemical reagents to form the insoluble compounding ingredient in particulate form and simultaneous coagulation of the aqueous dispersion, to form an aqueous slurry comprising the insoluble compounding ingredient enclosed or enmeshed in plastic material, after which the aqueous slurry is quickly and positively withdrawn from the zone of diffusional intermingling after initial mixing and reaction have occurred. By this method we have found that the plastic material surrounds and encloses extremely small particles of insoluble compounding ingredient in a manner as to prevent coalescence and agglomeration of the pigment particles and to prevent further pigment particle size growth by further precipitation, whereby a uniform and very high degree of dispersion of the compounding ingredient is achieved. After withdrawal from the zone of diffusional intermingling the resulting fine slurry of compounding ingredient enclosed in plastic material may be filtered, dried and, if desired, formed into sheets which may then be further compounded and admixed with other materials in the usual manner.

Plastic compositions in which the precipitated compounding ingredient or pigment reinforces, stabilizes, modifies or otherwise improves the plastic material are thereby obtained. The pigment-containing product may be used as a masterbatch and blended with additional crude plastic in a manner well known in the art.

A preferred form of apparatus for carrying out the methods of this invention is a liquid mixing device comprising a pipe or other elongated hollow form of limited total volume into which the reactants are introduced as separate solutions at the bottom thereof, and allowed to flow upward along the pipe under conditions of stream-lined flow, whereby the reactants intermingle by diffusional processes, and precipitation of the insoluble compounding material and coagulation of the aqueous dispersion occurs at the diffusional interface between the separate solutions. Of course, these separate solutions must be introduced to such a device at such a rate that the conditions of flow remain below the critical range at which turbulence occurs. Under such conditions, the separate solutions intermingle at the interface between the solutions under dilute conditions so that the precipitation of the compounding material occurs in very fine particulate form and the plastic material coagulates about the fine particles of the compounding material to form a fine slurry. After removal from the mixing device, the reactants are placed in a storage tank or other container in which further reaction may occur, and the crumbs separate from the clear serum.

The invention will now be described in greater detail with reference to certain preferred forms of apparatus for carrying out the invention as illustrated in the accompanying drawings, of which:

Fig. 1 is a schematic flow sheet for a preferred embodiment of the invention showing a preferred piping arrangement, and showing in particular the directions of flow of the reactants.

Fig. 2 is an enlarged sectional elevation of a pipe-like mixing device suitable for use in the process shown schematically in Fig. 1, and in particular showing the manner in which the reactant solutions enter the apparatus.

Fig. 3 is an enlarged sectional elevation of a tank-like mixing device suitable for use in the process as shown schematically in Fig. 1, and in particular showing the manner in which the liquid reactant enters the tank and how the resulting slurry leaves the tank by means of an adjustable overflow baffle.

Referring to the drawings, Fig. 1 is an illustrative flow-diagram for a process constituting a preferred embodiment of this invention in which calcium silicate is incorporated in a plastic material by precipitation of the silicate simultaneously with coagulation of a latex of the plastic material. The direction of flow of the material is indicated by means of arrows, and the various process steps are labeled by appropriate legends. As illustrated in Fig. 1, latex of a plastic material such as natural or synthetic rubber, and a sodium silicate solution are first diluted with soft, demineralized water in make-up tanks 10, 11 and then the dilute silicate solution added slowly with mild agitation to the diluted latex solution in tank 12. Calcium chloride is made up in a separate make-up tank 13. Both the latex water glass and the calcium chloride solutions are stored respectively in storage tanks 14, 15. From the storage tanks 14, 15, the several liquids are piped through appropriate meters 16, 17, (which may be conventional rotameters), to the pipe or other diffusional-type mixing device 18. The mixing device 18 is arranged to discharge into a slurry hold-up tank 19, from whence effluent is withdrawn to be filtered by an appropriate filtration apparatus 20. From the filter 20 the filter cake is dried in a drier 21, such as a vacuum steam-heated tray drier or a hot-air oven.

Fig. 2 is an enlarged sectional view of a suitable pipe-like mixing device comprising a short section 30 of pipe and a longer section 31 joined by a T-fitting 32. Into the horizontally extending section 30, the latex water-glass solution is introduced. The bottom of the T-fitting 32 supports a smaller internal pipe 33, within the T-fitting so as to extend upwardly a short distance into the upper extending portion 31 of the device. When this device is used in the process of Fig. 1 calcium chloride solution is introduced into the smaller pipe 33 while latex water-glass solution is introduced into section 30 of the device. The latter solution flows up through section 31 at the outside thereof around the rising stream of calcium chloride solution. Since the solutions are slowly introduced in stream-lined flow, the mixing of the solutions occurs at the diffusional interface. The device is also provided at the top thereof with a second T-fitting 34 open at the top and side through which the combined streams of the reactant solutions are removed through a take-off trough 35. The device may be of any size or proportions, but an illustrative device for small-scale operation used in the examples described hereinbelow is made up of 2" glass pipe sections with 2" T-fittings, the horizontal leg of which is 12" long and the upwardly extending leg of which is 42" long. Instead of glass such a device may be made of any other materials resistant to the reactant solutions such as soft iron pipe, chemical stoneware, glass-lined metal equipment, and the like, as is well understood in the art.

Fig. 3 shows a second form of a mixing device which may also be used in the process shown in Fig. 1. The device comprises a large tank 40 fitted at the bottom with a solution inlet pipe 41, and at the top with a second solution inlet pipe 42. At one side of the tank is provided an adjustable outflow baffle 43, arranged in such a manner that liquid may be withdrawn from the tank at any level below the surface of the water by loosening the screw 44 and grasping the handle 45 to move the baffle up and down as indicated at 46 in dotted line. Thus, the fluid from the tank enters the baffle at the bottom through the opening 47 and flows into the take-off trough 48 through the opening 49 and then to the storage tank.

In operation of this device in the process shown in Fig. 3. latex water-glass solution entering through inlet 42 forms a layer at the top of the tank 40 and the calcium chloride solution entering through inlet 41 forms a layer at the bottom of the tank. The two solutions diffuse slowly toward one another and come into contact at the diffusional interface where both solutions are relatively dilute, and a reaction there occurs forming the insoluble compounding pigment in very fine particulate form while the aqueous dispersion of plastic material or latex coagulates to enclose the fine particles in plastic material. The adjustable outflow baffle 43 is placed to withdraw the resulting slurry from the tank approximately at the diffusional interface so that the slurry resulting will be removed from further contact with fresh solution entering the tank at the bottom and top thereof.

The method of this invention is of particular importance in the preparation of compositions in which calcium silicate or some other precipitated pigment is associated with or incorporated in natural rubber, or synthetic rubbers such as are obtained by the copolymerization of butadiene-1,3 and styrene (particularly that synthetic rubber of the latter class known commercially as GR-S) or by the copolymerization of butadiene-1,3 and acrylonitrile, in order to reinforce the rubbery material. The method of this invention is also of particular importance in the preparation of compositions in which lead silicate or some other precipitated pigment is associated with or incorporated in plastic resinous materials such as are obtained by the polymerization of vinyl choloride either alone or with other monomeric materials copolymerizable therewith, such as vinyl acetate, vinylidene chloride, methyl and ethyl acrylate, and others in order to stabilize and reinforce the resinous plastic material. Compositions comprising a mixture of a rubbery material and a resinous material (such as a mixture of a butadiene-1,3 acrylonitrile copolymer with polyvinyl chloride) reinforced and/or stabilized with insoluble silicate are also advantageously produced by the method of this invention.

Accordingly, in the following specific examples, the method of this invention will be illustrated with specific relation to these preferred materials, and especially to show the effects of using certain preferred forms of apparatus and preferred manners of carrying out the methods of this invention, though the invention is not to be construed as limited thereto.

*Example I*

A co-precipitated calcium silicate synthetic rubber composition was made from latex prepared by polymerizing in aqueous emulsion a mixture of 75 parts butadiene-1,3 and 25 parts styrene. This type of latex is known commercially as GR-S Type 1, and has a total solids content of about 26 and 29% including about 2% of an age resistor (heptylated diphenylamine, added as an aqueous dispersion). A solution of latex water-glass was made by first diluting the latex with demineralized water, and then slowly adding the sodium silicate (water-glass) solution to the diluted latex with mild agitation. The sodium silicate used in this example and in the other examples hereinafter described, was a commercially available water solution, having a specific gravity from 1.40 to 1.48, a molal ratio of sodium oxide ($Na_2O$) to silicon dioxide ($SiO_2$) of from 1/2.84 to 1/3.14, and an ignition loss of about 61%. The solutions were mixed in the following proportions:

*Solution A*

| | Pounds |
|---|---|
| Demineralized water | 5,010 |
| Latex (26.2% T. S.) | 957 |
| Sodium silicate solution | 354 |

*Solution B*

| | Pounds |
|---|---|
| Calcium chloride, dry | 10.6 |
| Demineralized water | 759 |

The solutions were pumped into the pipe-like mixing device described hereinabove by bringing the latex water glass solution (Solution A) into the coagulator through the horizontal leg of the pipe coagulator. The calcium chloride solution (Solution B) was pumped into the pipe coagulator from the bottom through the small internal pipe. The piping arrangement was that shown in Fig. 1 of the drawing. Since the gravities of the Solutions A and B were about the same, the solutions were metered into the pump through rotameters on an equal-volume basis, sufficient to supply 12 lbs. per minute of each solution, and to produce 43 lbs. per hour theoretical of dry products per hour, the calcium chloride being supplied in excess of stoichiometrical proportions to insure coagulation of the latex. Precipitation of calcium silicate and coagulation of the latex to form an aqueous slurry of crumbs containing the synthetic rubber and the precipitated calcium silicate occurred upon passage of the solutions through the mixing device.

The mixing device was arranged to discharge directly into a hold-up tank from which the slurry was later withdrawn to be filtered. The final slurry was of about 3% in total solids content, and was quite fluid in nature. The slurry was fine, white and almost amorphous-like in appearance, closely resembling a chemical precipitate in appearance. After filtration on an Oliver-type filter, the filter cake, in the form of fine chips from the Oliver filter, was dried in a vacuum tray drier under about 26" mercury vacuum and with steam heating to produce a temperature of around 215° F.

Observation of the operation of the pipe-like mixing device revealed that the velocity of flow through the device was about .06 ft. per second, and that the total time for solution to pass through the device was about 96 seconds. The product slurry greatly resembled curdled milk when first formed but the particles of loose flocs were broken up by mild agitation in the storage vessel to which the slurry was delivered. The slurry was then filtered on an Oliver filter. The final filtered slurry was found to be of such a size as to pass through an 80-mesh screen.

The dried crumbs were almost rubber-like in appearance, the color ranging from light tan to brown. The crumbs were sheeted out by passing once or twice through a rubber mill having cold rolls. Inspection of the sheeted product unexpectedly revealed that it was light tan in color, and was almost perfectly translucent in thin milled sample. This last property is surprising since the product or masterbatch contained 50 parts of dry calcium silicate to 100 parts of butadiene-1,3 styrene copolymer or about 67 parts of hydrated calcium silicate to 100 parts of copolymer. The dried masterbatch was further compounded on a mixing mill with accelerators, sulphur and processing aids according to the following recipe:

*Recipe*

| Material: | Parts |
|---|---|
| Masterbatch | 157.8 |
| Cumar resin | 7.0 |
| Magnesium oxide | 5.0 |
| Triethanolamine | 3.0 |
| Triethyltrimethylenetriamine | 1.0 |
| Sulfur | 4.0 |

A vulcanizate prepared by vulcanization of the above compound for 75 minutes at 280° F. (optimum cure) possessed a tensile strength of 2600 lbs./sq. in., the modulus at 300% was 600 lbs./sq. in., the elongation was 775%, and the crescent tear resistance was 27 lbs. transversely and 25 lbs. longitudinally, or an average value of 26 lbs.

Another vulcanizate was prepared from a butadiene-1,3 styrene copolymer compound of the same type as above except no calcium silicate was present. The compound was vulcanized for 90 minutes at a temperature of 307° F. (optimum cure). The vulcanizate was tested to obtain comparative physical data to show the effects of adding the calcium silicate reinforcing pigment according to the methods of this invention. This vulcanizate exhibited a tensile strength of 200 lbs./sq. in., no modulus at 300%, an elongation of 360%, and a crescent tear resistance of 5.4 lbs. average transversely, and 8.6 lbs. longitudinally, or an average value of 7 lbs. Thus the addition of the calcium silicate to the polymer according to the method of this invention produced an increase in the tensile strength of butadiene-1,3 styrene copolymer vulcanizate of 1237%, an increase in the modulus of 1150 lbs./sq. in., an increase in percent elongation of 258% and an increase in the tear resistance of 268%.

A third vulcanizate was prepared to obtain physical testing data to compare with the results above and more specifically to show how much more effective the calcium silicate is when added to the polymer according to the method of this invention, than when it is added to the polymer by the conventional dry-mixing methods. A butadiene-1,3 styrene copolymer compound was prepared according to the recipe given above, except that in place of the mixing procedure described, an equivalent amount (50 parts to 100 parts copolymer) of a commercially available precipitated calcium silicate compounding material known as Silene EF, was dry-milled into the synthetic rubber on a rubber mill. This compound when vulcanized for 75 minutes at 280° F. (optimum cure) yielded a vulcanizate which exhibited a tensile strength of 1,000 lbs./sq. in., a modulus at 300% of 975 lbs./sq. in., an elongation of 300%, and an average crescent tear resistance of 10 lbs. Thus, the addition of dry calcium silicate by mixing on a rubber mill increased the tensile strength of the GR-S vulcanizate only about 400% as compared with the increase of 1237% afforded by the calcium silicate when added according to this invention; the modulus at 300% was increased only 975 lbs./sq. in. as compared with 1150 lbs./sq. in. by the method of this invention; elongation was less than in the vulcanizate containing no calcium silicate, as compared with a 258% increase shown by vulcanizates prepared by the method of this invention; and the crescent tear resistance was increased by only 42% as compared with the 268% increase obtainable by the addition of calcium silicate according to the method of this invention.

Samples of the above-described synthetic rubber products containing calcium silicate and of other plastic compositions containing calcium silicate to be hereinafter described, where examined in the unvulcanized uncompounded condition under a compound microscope at 200 diameter magnification, both in light and dark fields, the sample being prepared according to the procedure for the preparation of microscopy samples outlined in the publication: R. P. Allen, Industrial Engineering Chemistry Analytical Edition, volume II, pages 3–11, 1930. The agglomerates in a given sized sample were counted, the number substracted from 100, and the result averaged for several samples to obtain a qualitative indication, expressed in percent, of the degree of dispersion. According to this control test the butadiene-1,3 styrene copolymer compositions containing calcium silicate and produced according to this invention as first described in this example, showed an 80–85% dispersion and the few agglomerates present were very small and well-dispersed. The best butadiene-1,3 styrene copolymer composition containing milled-in dry calcium silicate, however, exhibited a degree of dispersion, according to the above-described microscopic examination, of 70 to 75% or less with relatively larger agglomerates present. Thus, synthetic rubber compositions containing calcium silicate produced by dry-milling effectively utilized only 75% of the pigment and, moreover, large agglomerates constituting 25% or more of pigment added, serve as foci of weakness whereby the properties of tensile strength, wear or abrasion-resistance and tear resistance were reduced to such an extent as vary nearly to destroy the benefits obtained by adding the calcium silicate.

*Example II*

Further to illustrate the effects of pigment precipitation and simultaneous coagulation of the aqueous dispersion of plastic material in the interfacial region of the reaction zone on the degree of dispersion and the particle-size of the calcium silicate, a masterbatch of 50 parts of dry calcium silicate in 100 parts of GR-S synthetic rubber was prepared by introducing one reactant solution at the bottom and one solution at the top of the large tank-like vessel of the type illustrated in Fig. 3 of the drawing. The concentration of the reactant solutions was the same as those shown in Example I and solutions were metered into the tank through rotameters at a rate of 12 lbs. per minute of each solution or a theoretical product rate of 43 lbs. dry masterbatch per hour. The resulting slurry was about 3% total solids content and was extremely fluid in nature, with the result that it handled well in the subsequent oliver filtration step. The product yield was 95%, and the dry crumbs were dark brown in color.

A cold milled sample of the product was extremely translucent in appearance and upon microscopic examination according to the methods given in Example I, was found to possess a degree of dispersion of 100%. The product, when compounded according to the recipe of Example I and vulcanized for 60 minutes at 280° F., possessed an ultimate tensile strength of 3,000 lbs./sq. in., a modulus at 300% of 950 lbs./sq. in., and an elongation of 650%. Thus, it is seen that the greater separation in the point of entrance of the reactant solutions permitted the establishment of a clearly defined reaction interface, which aided in obtaining a greater degree of dispersion and a finer average particle size. Furthermore, the product possessed excellent processing characteristics for it blended with crude GR-S-type synthetic rubber with little difficulty in conventional rubber machinery.

To compare the effects of longer hold-up time and mild agitation in the reaction zone with the smooth diffusional intermingling and quick removal from the reaction zone which is characteristic of this invention, a masterbatch of 50 parts dry calcium silicate in 100 parts of GR-S synthetic rubber was prepared using reactant solutions of the proportions and constituents shown in Example I. Separate streams of the two solutions were run into a 100 gal. wooden tank, similar to that shown in Fig. 3, initially containing enough demineralized water just to cover two 6" 3-bladed marine type impellers which were supported therein and which were turning at 360 R. P. M. The reactants were metered into the tank in proportions sufficient to produce a 5% final slurry. The wooden tank continuously overflowed into an Oliver filter. The final product was in the form of large flocs resembling sour milk. The degree of dispersion was about 80% but microscopic examination revealed the presence of very large interconnected agglomerates. A composition produced from this material according to the recipe of Example I was cured for 30 minutes at 280° F. (optimum cure) to produce a vulcanizate which exhibited a tensile strength of 1500 lbs./sq. in., and a modulus at 300% of 400% lbs./sq in. A sheeted sample of the dry product was white and opaque showing the presence of large agglomerates surrounded and enclosed by synthetic rubber. Accordingly, it is seen that the hold-up time in the tank was too long, and the mild agitation permitted growth of the pigment particle size and agglomeration of the pigment particles to take place. This experiment shows therefore that the diffusional system is superior to mildly agitated systems.

*Example III*

To illustrate the effect on the properties of the final product of increasing the flow rate of the separate reactant solutions through a piece of apparatus of given volume, a series of calcium silicate synthetic rubber compositions were made in the proportions of 50 parts dry calcium silicate to 100 parts of butadiene-1,3 styrene synthetic rubber (GR-S Type 1). The equipment was the large tank-like vessel of Example II shown in Fig. 3 of the drawings. The two reactant solutions were prepared using the materials and procedure described in Example I. The reactants were metered into the tank at the following rates:

2.75 lbs. per min. of each solution to produce 10 lbs. per hour of dry product
6.8 lbs. per min. of each reactant solution to produce about 25 lbs. per hour of dry product
14 lbs. per min. of each reactant solution to produce about 50 lbs. per hour of dry product
17.5 lbs. per min. of each solution to produce 65 lbs. per hour of dry product All the above low rates produced final slurries of about 3% total solids.

All the final slurries in the above series of runs were extremely white and fluid in nature. After filtration on an Oliver filter the fine precipitates were dried in the vacuum drier at about 26" mercury vacuum and 215° F. in temperature. The dried crumbs ranged from light tan to dark brown in color and when milled on a cold mill, the samples were very translucent, closely resembling gum rubber in appearance. However, under the microscope the sample prepared at the rate of 10 lbs. per hour dry product showed less than 80% dispersion; that prepared at 25 lbs. per hour showed 85% dispersion; that prepared at 50 lbs. per hour showed 90% dispersion; and that at 65 lbs. per hour showed 100% dispersion. The physical properties of the above products, when compounded and vulcanized, indicate that the products made at lower flow rates are relatively slower curing than materials made at higher flow rates. Moreover, the degree of dispersion, as indicated by the microscopic examination, revealed that the lower flow rate permitted some agglomeration of pigment particles. This latter phenomenon probably was due to the fact that the hold-up time in the reaction vessel was too long, permitting growth and agglomeration of the pigment particles to take place before removal from the reaction zone.

*Example IV*

To compare the effect of increasing the concentrations of the reactant solutions so as to produce final slurries of higher total solids content with the lower concentration slurries of the previous examples, a number of GR-S synthetic rubber calcium silicate compositions were made using the pipe-like mixing device described in Example I. The slurry concentrations tried were 1%, 3%, 6% and 9%. At 1% the degree of dispersion was excellent, being 95 to 100%; at 3% the milled sample was transparent, and possessed an excellent degree of dispersion of 90% or more; and at 6% the milled sample was still translucent and clear, but had some white streaks, showing that agglomerates were present. This was borne out by the microscopic examination, which revealed a slightly lower dispersion of about 85%. At 9% final slurry concentration the milled sample was white and powdery, revealing the presence of excessive agglomeration, and relatively larger particle size and the dispersion was 75-80%. Moreover, at 9% final slurry, it was found that the agglomerates were relatively large though the average particle size was smaller, the presence of the large agglomerates destroying any beneficial effects obtained from the presence of the smaller particle size. It was found, therefore, that final slurry concentration of the order of about 1 to 6% was most satisfactory, and that such slurries are easiest to process and control.

*Example V*

It was found that natural rubber could be utilized as the plastic material in the method of this invention. A commercially available concentrated natural rubber latex of about 60% total solids content was used to prepare a composition containing natural rubber and calcium silicate. Both reactants were prepared according to the method of Example I and according to the following proportions:

| Latex water glass solution: | Pounds |
|---|---|
| Natural rubber latex | 28.2 |
| Demineralized water | 35.9 |
| Water glass | 22.3 |
| Demineralized water | 42 |
| Calcium chloride solution: | |
| Calcium chloride | 5.4 |
| Demineralized water | 299 |

The solutions were metered into the pipe-like device described in Example I at the rate of 7 lbs. per minute of each reactant, or at a rate of 25 lbs. per hour of dry product. The final slurry from the mixing device was thick and creamy, though only 3% in total solids content, but was found capable of being filtered on an Oliver filter. The milled sample of the dried crumbs was transparent and clear and possessed a dispersion of 95%. The product processed very well, and could be blended with crude natural and synthetic rubbers on a rubber mill or in a banbury type mixer. When compounded and vulcanized it possessed physical properties superior to those secured by milling dry calcium silicate into natural rubber.

Example VI

Similar masterbatches were prepared using latex of an oil-resistant synthetic rubber prepared by emulsion polymerization of 55 parts butadiene-1,3 and 45 parts acrylonitrile. The reactant solutions were prepared according to the method of Example I in that the latex was first diluted with demineralized water, and then the water glass was likewise diluted with demineralized water before combining into one solution. The solutions were prepared according to the following proportions:

| Latex solution: | Pounds |
| --- | --- |
| Latex (33.7% ps) | 37.8 |
| Demineralized water | 209 |
| Water glass solution: | |
| Water glass | 17.8 |
| Demineralized water | 41.7 |
| Calcium chloride solution: | |
| Calcium chloride | 5.4 |
| Demineralized water | 387 |

The two reactant solutions were metered into the mixing device described in Example I at a rate of 7 lbs. per minute for each reactant solution to produce about 23 lbs. per hour of dry product. The slurry was composed of very fine particles but was found to be easily filtered on the Oliver filter. The serum portions of the slurry were very clear. The dry product was of a uniform, dark-brown color and was found to be rather tough but when milled into a thin sheet it was clear and translucent and was found to have good processing qualities for it was found to blend into other rubber materials rather easily. Upon microscopic examination, the dispersion was found to be 95%.

Example VII

Calcium silicate was dispersed in a vinyl chloride resin prepared by the emulsion polymerization of 80 parts of vinyl chloride and 20 parts of methyl acrylate. A latex of this polymer of 55.5 total solids content was mixed with water glass to form one reactant solution while the other reaction solution consisted of aqueous calcium chloride solution. The concentration of the calcium chloride solution was the same as in Example VI, and the latex water glass solution was prepared according to the following proportions:

| Latex water glass solution: | Pounds |
| --- | --- |
| Latex (55.5% T. S.) | 28.7 |
| Water | 270.5 |
| Water glass | 22.3 |
| Demineralized water | 41.7 |

The solutions were metered into the pipe-like mixing device described in Example I at the rate of 7 lbs. per minute for each reactant or a theoretical production rate of 21 lbs. per hour of dry product. The final slurry was very fine and slimy in character and was difficult to filter, but after heating to 96° C. for several minutes the slurry flocculated and coarse, hard granules formed which were easily retained on the Oliver filter. The product after drying was very difficult to sheet out on the mill without plasticizer, but when plasticizer was added to the material on the mill, the sheet was translucent and clear. The dispersion was found to be 95%. The physical properties were excellent, especially the tensile strength, the wear resistance and tear resistance.

Example VIII

Due to the difficulty in milling of the products obtained in Example VII, plasticized latex of the same vinyl chloride methyl acrylate polymer was used to prepare a composition containing 50 parts of dry calcium silicate per 100 parts of polymer. The latex was plasticized by addition to 100 parts of latex of 25 parts of butyl phthalyl butyl glycolate as an aqueous emulsion. The solutions were prepared according to the methods and the proportions of Example VII. The solutions were run into the pipe-like mixing device described in Example I at the rate of 9.5 lbs. per minute for each reactant, or a theoretical product rate of 33.5 lbs. of dry product per hour. The final slurry was approximately 3% in total solids content, and was extremely fine, but flocculated when heated to 96° C. for several minutes. After filtering and drying the crumbs milled very easily on a cold mill forming a smooth translucent sheet on the first or second pass through the mill. Upon microscopic examination, the product was found to possess a dispersion of 95%. Very few agglomerates were found in the sample, and those present were very small and scattered. The serum obtained from filtering operation was clear, indicating that all calcium silicate was included in the polymer and that little, of the plasticizer emulsion was lost. The physical properties were otherwise similar to those of the material of Example VII after addition of plasticizer on the mixing mill. Thus, it is seen that the method of this invention offers a convenient method by which plasticizer and compounding ingredients may be inexpensively incorporated in resin compositions.

Example IX

A plastic composition that contained 50 parts of calcium silicate in 100 parts of a polymer of vinyl chloride was prepared. The latex used in this example was one of 49.5% total solids content prepared by the emulsion polymerization of vinyl chloride. The latex was plasticized after polymerization but before incorporation of the pigment by the addition of a 65% aqueous emulsion of dioctyl phthalate. The two reactant solutions for the process were prepared in the following proportions:

| Latex water glass solution: | Pounds |
| --- | --- |
| Water | 146 |
| Latex | 12.1 |
| Plasticizer emulsion (65%) | 3.23 |
| Water glass | 5.9 |
| Calcium chloride solution: | Pounds |
| Calcium chloride | 12.0 |
| Water | 838 |

The solutions were metered into the pipe-like device described in Example I at the rate of 8 lbs. per minute of each solution to produce a final slurry of about 3% total solids content, or a theoretical rate of about 30 lbs. dry product per hour. The final slurry was extremely fine, but when heated to 85° C., it was found to filter fairly well, leaving a clear serum. The crumbs were dried for 16 hours at 220° F. under 27" Hg. vacuum. A sample of the dried product was found to break down into a smooth, translucent sheet with just one or two passes through the mill. The dispersion was 95%. The physical properties were much superior to a similar plasticized resin to which calcium silicate had been added by dry-mixing methods.

Example X

The previous examples have been concerned with the preparation of plastic compositions in which the plastic constituents predominated. It was found, however, that a highly plastic polymer produced by the emulsion polymerization of 75 parts butadiene-1,3 and 25 parts styrene, when co-precipitated with calcium silicate in proportions as low as 5, 10 or 15 parts of the polymer in 100 parts of the pigment greatly improved the dispersion of such pigment upon subsequent dry milling into solid, rubbery material. It was found that such a composition could very easily be made by the methods described in the foregoing examples using reactant solutions of the type set forth in the previous examples. It was further found that the latex of the polymer used is preferably of a very fine particle size in order to adequately coat the small individual particles of pigment. In the instant example, the latex used was prepared by terminating the polymerization of a normal butadiene-1,3 styrene copolymer when only 60% of the monomers were converted to the copolymer state and had a total solids content of about 8.4%. A composition containing 10 parts of polymer in 100 parts of dry calcium silicate was prepared by metering the two reactant solutions into the pipe-like mixing device described in Example I. The flow rate of each reactant solution was adjusted to produce a final slurry of about 3% total solids. The final slurry was easily handled upon conventional de-watering equipment such as the Oliver filter. The serum from the Oliver filter was clear indicating that little product was lost in the serum portion of the slurry. The dried product was a fine crumb which was so friable that it could be reduced to a silky powder between the fingers. The final product was found to mill into rubbery material with considerably more ease than ordinarily dried precipitated pigments. Furthermore, it was found that it would mill into dry plastic materials without a pre-grinding operation for the friable crumbs broke down on a rubber mill and dispersed themselves well in the plastic material. However, grinding was found to improve the degree of dispersion achieved upon milling such material into solid plastic materials upon conventional rubber machinery. A vulcanizate compounded according to the recipe of Example I (with enough GR-S added to reach proportions equivalent to those of Example I) and vulcanized 45 minutes at 280° F., possessed a tensile strength of 1800 lbs./sq. in., a modulus of 300% at 880 lbs./sq. in., and an elongation of 600%. Thus, the polymer coated calcium silicate produced a vulcanizate having a tensile strength 80% higher than a vulcanizate prepared by milling in uncoated calcium silicate (see Example I), the same modulus and an elongation 83⅓% higher than a vulcanizate containing the milled-in, uncoated calcium silicate. Besides improving the physical properties, the coated calcium silicate was easier to use in manufacturing operations because milling time was cut down and working conditions improved for the coated pigment was not so easily picked up and carried in the air.

Example XI

The foregoing examples have been concerned with the co-precipitation of calcium silicate in natural rubber, synthetic rubbers and in synthetic resins. It has also been found that water-insoluble lead silicate may be co-precipitated with a blend of resinous and rubbery materials. Sodium silicate solution was added to a latex of a plastic polymer containing 28% total solids which was prepared by the polymerization in aqueous emulsion of 55 parts of butadiene-1,3 and 45 parts by weight of acrylonitrile. Lead acetate or nitrate was added to a stabilized synthetic latex of 49.5% total solids content prepared by polymerization in aqueous emulsion of vinyl chloride. The two latices were warmed and blended (to produce a 50/50 rubber-resin blend) just before adding to the tank-like device shown in Fig. 3 of the drawings along with a calcium chloride solution for coagulation of the latex. The lead silicate precipitated in finely-divided form and the blended latices coagulated in the form of a fine slurry. The resulting slurry was filtered as before and dried. The resulting blend of resin and synthetic rubber containing lead silicate sheeted out on a rubber mill with several passes through the mill and was found to possess much greater heat stability and electrical resistivity than a similar blend to which the lead silicate stabilizer had been added by dry-mixing methods on a rubber mill or internal mixer.

Still another method of accomplishing co-precipitation of a water-insoluble pigment and a resin or rubbery material consists in preparing two different latices of the same or different rubbery or resin-like materials. One of the latices may be prepared by emulsion polymerization in the presence of well-known cationic emulsifying materials such as soap and the other latex may be similarly prepared by emulsion polymerization in the presence of an anionic emulsification agent such as lauryl amine hydrochloride. To each of the latices a water-soluble component of the insoluble pigment ingredient may be added and the latices passed into a suitable diffusion-type mixing device with or without the addition of auxiliary coagulating agents. The coalescence of the cationic and anionic rubber and/or resin particles insures speedy enclosure of the pigment particle in resin or rubbery polymer.

The foregoing examples show that the pipe-like and tank-like diffusional mixing devices are quite efficient in this process. The pipe-like device shown in Fig. 2 of the drawing is one of the simplest forms of diffusional mixing devices. Due to its extreme simplicity of construction such a device is easily maintained and is not easily fouled by deposits of rubber and/or hard precipitated pigment material from the precipitation process. However, the pipe-like device is of limited capacity, and it will be found that in larger scale operations, the large tank-like device may be preferred.

The large tank-like device shown in Fig. 3 of the drawing has the added advantage in that the mixing of the reactant solutions to any degree before reaction may be prevented until the soluble portions of the reactant solution diffuse toward one another and mix at the diffusional interface, thereby preventing growth and agglomeration of pigment particles formed.

As revealed in the foregoing examples, variables in the process sometimes have appreciable effects on the qualities of the final pigment plastic composition. For example, it has been shown that lower concentrations of the reactant solutions (producing a final slurry of low total solids content) generally produce compositions having fewer pigment agglomerates, and improved physical properties. However, with shorter hold-up time in the reaction zone, it was found that reactant solutions of higher concentration could be utilized. To illustrate, with the flow rates of the examples, reactant solutions of a strength to produce final slurries of about 1 to 6% total solids content produce best results, while higher concentrations tend to produce pigment agglomeration and particle growth. Thus, it was found that slurry concentrations of a higher total solids content of 6 to 20% could be used if the flow-rates through the system were increased. However, the maximum slurry concentrations that could be handled were limited by the fact that the more concentrated reactant solutions produced final slurries that were more viscous and which appeared almost thixotropic in nature, and moreover, since the conditions of flow through the coagulator must be of substantially stream-lined flow, the maximum through-put is limited by the latter condition.

It is also apparent from the foregoing examples that the incorporation of precipitated pigments in plastic materials by simultaneous co-precipitation of the pigment and an aqueous dispersion of the plastic material, yield compositions that are much superior to those in which the pigment is incorporated by the conventional dry-mixing methods. In the former compositions, the pigment greatly reinforces the plastic material improving its tensile strength, tear resistance, and other properties, such as abrasion resistance and resistance to flex-cracking, while in the latter composition the pigment acts merely as a filler, sometimes actually reducing some of the physical properties of the plastic composition.

The method of this invention has been found to produce compositions containing a precipitated pigment of .05 micron or smaller in average particle size. Microscopic examination shows that the particle size of 85% or more of the pigment particles is below .03 micron. This uniform small particle size of the co-precipitated pigment and the uniform and intimate association of the particles with the plastic material as obtained by the practice of this invention are believed responsible for the outstanding improvements in physical properties found in the products obtained.

Natural and synthetic rubber compositions of the type illustrated in the examples are of considerable value in the manufacture of inner tubes, water-curing bags, and tires (calcium silicate being especially adaptable for white sidewall tires because of the light color of calcium silicate rubber compositions). The compositions of the examples containing vinyl resins and precipitated lead or calcium silicate are especially suitable for use in the manufacture of semi-translucent or light-colored stocks wherein high tensile strength and abrasion resistance are to be desired, as in curtain materials, raincoats, and the like. The compositions of the examples containing lead silicate in admixture with the vinyl polymers are especially suitable for use in the manufacture of articles wherein high chemical and physical stability and electrical resistivity are essential, as in electrical insulation, flooring materials and the like.

Although the examples are illustrative of the preferred methods of practicing the invention, numerous variations and modifications may be effected in the apparatus used and so long as diffusional mixing takes place, and in the kind and amounts of the materials used therein, as well as in the procedures used therewith, while still retaining the advantages described.

Many plastic materials are equivalent for the purposes of this invention to the materials used in the example. Thus, any of the natural rubbers or resins in the form of naturally occurring or artificially prepared aqueous dispersions may be used; any of the synthetic rubber latices such as those prepared by the copolymerization of butadiene-1,3 and styrene, but preferably those polymers having a butadiene-styrene ratio of one part of butadiene-1,3 to $\frac{1}{10}$ to two parts of styrene; synthetic rubber latices prepared by substituting all or part of the butadiene-1,3 with other butadiene-1,3 hydrocarbons, such as isoprene, 2,3-dimethyl butadiene-1,3, piperylene 3-methyl-pentadiene-1,3 or with substituted aliphatic conjugated dienes such as 2-chloro-butadiene-1,3 and others; synthetic rubber latices prepared by substituting all or a part of the styrene with other organic compounds containing single olefinic double bond, and which are well-known to be copolymerizable with butadiene-1,3 hydrocarbons such as acrylonitrile, methyl methacrylate, chlorostyrenes and the like; any of the aqueous dispersions produced by emulsion polymerization (or produced from a solid polymer by artificial means) of the chloroethylenes containing from one to two chlorine atoms on one only of the carbon atoms such as vinyl chloride and vinylidene chloride, either singly or in combination with other such chloroethylenes and/or copolymerized with one or more other monomeric materials copolymerizable therewith such as methyl and ethyl acrylate, styrene and others; aqueous dispersions of such polymers as polymerized methyl and ethyl acrylate and methacrylate, polystyrene, polyisobutylene and copolymers of isobutylene with other materials, polyethylene and the like, polyvinyl acetate, polyalkylene polysulfides, and the like; and aqueous dispersions of synthetic polymeric resinous materials such as the fusible phenol-formaldehyde resins and the fusible urea-formaldehyde resins and the like. In short, any aqueous dispersion of an organic polymeric material in the plastic condition (which may or may not require the presence of plasticizer) may be used in the method of this invention.

Good results have been obtained with aqueous dispersions of the plastic rubber-like materials including the natural rubbers such as hevea, balata, guttapercha, guayule, and other naturally occurring gums; aqueous dispersions of the diene synthetic rubbers enumerated hereinabove; and aqueous dispersion of the synthetic resins which are rubber-like such as plasticized polyvinyl chloride, plasticized copolymers of vinyl chloride with other materials, and in addition other rubber-like materials such as polyalkyl acrylates, polyalkylene polysulfides, and the like, polyisobutylene, and copolymers of isobutylene with other materials, etc.

Particularly good results have been obtained with aqueous dispersions of the vulcanizable rubber-like materials such as the natural rubbers already enumerated, the sulfur vulcanizable synthetic rubber-like materials including the polymers of the butadiene-1,3 hydrocarbons, either alone or with monomeric materials well known to be copolymerizable therewith; and other sulfur vulcanizing rubber-like materials such as the polyalkylene polysulfides, and others. Moreover, rubber-like materials such as polymerized 2-chloro-butadiene-1,3, known commercially as the neoprene type synthetic rubber, which is vulcanizable or curable with other chemical reagents such as the metallic oxides, are also especially useful in this process. These vulcanizable rubber-like materials have been found to be particularly useful in combination with reinforcing precipitated pigments such as calcium silicate, and the like.

It is also possible to effect numerous variations in the nature of the water-soluble solutions used to treat the aqueous dispersion of the plastic materials prior to or during the co-precipitation of the plastic material and the insoluble pigment. These variations and modifications, of course, will depend upon the particular pigment which it is desired to precipitate. If an insoluble metallic silicate such as those of calcium, barium, strontium, magnesium, aluminum, copper, iron, manganese, lead or zinc, is the desired precipitate, this may be formed by the reaction of an aqueous solution of the water-soluble salt of the metal such as the chloride, acetate, or nitrate with an aqueous solution of a water-soluble silicate such as those of potassium, sodium and ammonium. Instances of the formation of an insoluble silicate are those of the reaction of aqueous solutions of calcium chloride, calcium acetate, or calcium nitrate with sodium or potassium silicate or the reaction of aqueous solution of sodium silicate or potassium silicate with aqueous solutions of lead nitrate or lead acetate. Other insoluble, inorganic pigments may be similarly co-precipitated with plastic materials by the reaction of aqueous solutions of two different water-soluble salts. For example, calcium carbonate may be precipitated by mixing an aqueous solution of sodium or ammonium carbonate, or carbonic acid with an aqueous solution of calcium chloride, acetate or nitrate; barium sulfate may be precipitated by reacting an aqueous solution of a water-soluble barium salt such as barium chloride with an aqueous solution of a water-soluble sulfate such as sodium sulfate; lead chromate may be precipitated by reacting an aqueous solution of a water-soluble lead salt such as lead nitrate or acetate with an aqueous solution of a water-soluble chromate such as sodium chromate; cadmium sulfide may be precipitated by reacting an aqueous solution of a water-soluble sulfide such as ammonium sulfide with an aqueous solution of a water-soluble cadmium salt such as cadmium acetate; aluminum silicate may be precipitated by using an aqueous solution of aluminum chloride with an aqueous solution of sodium or potassium silicate; calcium phosphate may be precipitated by using an aqueous solution of calcium chloride and an aqueous solution of sodium phosphate; and numerous other water-insoluble inorganic pigments may be precipitated by using aqueous solutions of water-soluble salts which react to form a precipitate, as will be apparent to those skilled in the art.

If an insoluble metallo-organic salt of the type frequently employed in plastic materials as an age resistor, vulcanization accelerator or activator, or as a stabilizing agent, is the desired precipitate in conjunction with a plastic material, this may be formed by using an aqueous solution of a water-soluble organic salt and an aqueous solution of a water-soluble salt of the desired metal. For example, the zinc and lead salt of 2-mercapto-4,5-dimethyl thiazole, 2-mercapto-4-ethyl thiazole, mercapto-benzothiazole and other thiazoles, thiazolines, and dithiocarbamates, which are used as accelerators of vulcanization, may be prepared in this manner. The preparation of the zinc salt of 2-mercapto-4,5-dimethyl thiazole, is as follows:

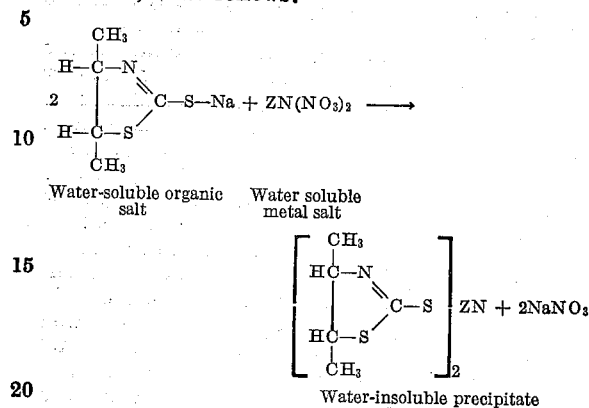

The manner of treating the aqueous dispersions of plastic material with the aqueous solutions of water-soluble salt so as to effect co-precipitation of the insoluble pigment and the plastic material may be varied according to the materials used. If one of the solutions is of such a nature as to not coagulate the latex, it may be admixed therewith and the combined solution added to the other water-soluble solution in the diffusional mixing device. This latter procedure is illustrated in the examples by the initial admixing of the sodium silicate solution with the latex. However, some of the water-soluble salts, particularly those of the polyvalent metals, have a very specific coagulative effect on latex and in other cases one of the water-soluble reactants may be a strong base or a strong acid having coagulative action on the latex. In these cases, the solutions may be kept out of contact with the latex until the moment of co-precipitation and, therefore, these reactants may be added to the mixing device as separate streams. Thus, in some cases it may be necessary to separately prepare two, three or even a greater number of separate solutions of water-soluble reactants, and to effect diffusional mixing of these different streams of solutions with the aqueous dispersion of plastic material.

It has been found that the amount of precipitated pigment associated with the plastic material may be widely varied from as little as 5 to 10 parts or less of the pigment to 100 parts of the plastic material to as much as 100 parts of the precipitated pigment to five to ten parts of the plastic material. When the plastic material is in preponderance, as for example when there is about 10 to 80 parts of the pigment in 100 parts of plastic, the final products are suitable for use in manufacturing useful plastic articles as they are obtained or upon the mere admixture of other chemical compounding ingredients. However, as has been pointed out in the example, as little as five to ten parts of plastic material associated with 100 parts of precipitated pigment is sufficient to coat the pigment particles so as to prevent pigment agglomeration, to greatly increase the ease with which such coated pigment is mixed into additional plastic material and to greatly improve the physical properties of plastic composition to which such coated pigments are added.

Coagulation of the aqueous dispersion of a plastic material simultaneously with precipitation of pigment is generally inherent in the method because of the materials utilized. For instance, the coagulation of the aqueous dispersion of plastic material may be brought about in whole or in part by one or both of the salt solutions employed, or by the soluble salt formed by the reaction to form the insoluble precipitate. The precipitation may also be accomplished by adding to the reaction zone a separate stream of an acid or base in order to insure complete coagulation of the plastic material of the aqueous dispersion. In any event, and regardless of what coagulating agent is used, the product from the reaction zone is an aqueous slurry of fine crumbs of the plastic material containing the precipitated pigment.

Filtering, washing and drying of the crumbs of plastic material containing precipitated pigment may be accomplished in the manner described in the examples or by any other of the methods well known to the art. However, it has been found that washing the crumbs containing the insoluble pigment in some cases, particularly when the pigment is calcium silicate, produces partial hydrolysis of the pigment unless the wash water contains a soluble constituent of a nature to inhibit hydrolysis, such as calcium hydroxide. The crumbs may be sheeted as described in the examples for further use in compounding operations or may be admixed with further plastic material in plastic compounding machinery together with any other desired ingredients such as plasticizers, fillers, vulcanizing agents, etc.

While we have disclosed certain preferred manners of performing my invention, we do not thereby desire or intend to limit ourselves solely thereto, for the precise proportions of the materials utilized may be varied and equivalent chemical materials may be employed, if desired, without departing from the spirit and scope of the invention as defined in the appended claims.

We claim:

1. The method of preparing a plastic composition comprising a plastic organic polymeric material containing a solid water-insoluble compounding material dispersed therein, which method comprises admixing a dilute coagulable aqueous dispersion of said plastic organic polymeric material with a dilute aqueous solution of a water-soluble chemical reagent, said chemical reagent having no substantial coagulative action on said dispersion and also being one component from which said compounding material may be produced by chemical reaction, preparing an aqueous solution of a second water-soluble chemical reagent reactive with the first said reagent in the formation of said insoluble compounding material and also being capable of coagulating said dispersion, said coagulative reagent being supplied in amounts in excess of that required to react with said non-coagulative reagent so as to insure coagulation of said dispersion, simultaneously introducing separate streams of said aqueous dispersion containing said second reagent and of said coagulative reagent into a reaction zone at separated points therein, the concentration of both said reagents and of said polymeric material in said streams being sufficient to form a final aqueous slurry of from 1 to 6% by weight total solids, flowing said separate streams through said zone in contact one with the other without turbulent intermingling of same, effecting contact for the first time between said first and second reagents contained in said streams during said flow by diffusional migration thereof from one stream to the other to effect precipitation of said compounding material in the form of particles below .05 micron in diameter, effecting contact for the first time between said polymeric material and said coagulating reagent during said flow by diffusional migration thereof from one stream to the other to effect coagulation of said polymeric material about said particles to form a crumb-like product containing said particles of compounding material uniformly and intimately dispersed in said polymeric material, and removing said product as it is formed from said reaction zone at a point remote from the points of entrance of said separate streams.

2. The method of preparing a composition comprising a plastic organic polymeric material containing a solid water-insoluble metallic silicate dispersed therein, which method comprises mixing a dilute coagulable aqueous dispersion of said polymeric material with a dilute aqueous solution of a water-soluble silicate, preparing a dilute aqueous solution of a water-soluble metal salt reactive with said soluble silicate to form said insoluble metallic silicate and capable of coagulating said dispersion, said metal salt being supplied in excess of the amount required to react with said soluble silicate so as to insure coagulation of said dispersion, simultaneously introducing a separate stream of said silicate-containing dispersion and a separate stream of said metal salt solution to a reaction zone at separated points therein, the concentration of said soluble silicate, said metal salt and said polymeric material in said streams being sufficient to produce a final slurry of from 1 to 6% by weight total solids, allowing said separate streams to form themselves into separate and distinct layers in said reaction zone, flowing said separate layers through said zone in contact one with the other without substantial turbulent intermingling of same, effecting contact between said soluble silicate and said metal salt contained in said streams for the first time during said flow by diffusional migration thereof from one stream to the other to effect precipitation of said insoluble silicate in the form of particles below .05 micron in diameter, effecting contact between said dispersed polymeric material and said metal salt contained in said streams for the first time during said flow by diffusional migration thereof from one stream to the other to effect coagulation of said polymeric material about said particles of insoluble silicate to form a crumb-like product containing said particles uniformly and intimately dispersed in said polymeric material, and removing said product from the reaction zone at a point remote from the points of entrance of said separate streams.

3. The method of preparing a composition comprising a plastic organic polymeric material containing a solid water-insoluble metallic silicate dispersed therein, which method comprises mixing a dilute coagulable aqueous dispersion of said polymeric material with a dilute aqueous solution of a water-soluble silicate, preparing a dilute aqueous solution of a water-soluble metal salt reactive with said soluble silicate to form said insoluble metallic silicate and capable of coagulating said dispersion, said metal salt being supplied in excess of the amount required to react with said soluble silicate so as to insure coagulation of said dispersion, simultaneously introducing separate streams of said aqueous dispersion containing said soluble silicate and of said solution containing said metal salt into a reaction zone at separated points therein, the concentration of said soluble silicate, said metal salt and said polymeric material in said streams being sufficient to produce a final slurry of from 1 to 6% by weight total solids, flowing said separate streams through said zone in contact one with the other without turbulent intermingling of same, effecting contact between said soluble silicate and said metal salt contained in said streams for the first time during said flow by diffusional migration thereof from one stream to the other to effect precipitation of said insoluble metallic silicate in the form of particles below .05 micron in diameter, effecting contact between said dispersed polymeric material and said metal salt contained in said streams for the first time during said flow by diffusional migration thereof from one stream to the other to effect coagulation of said polymeric material about said particles of insoluble silicate to form a crumb-like product containing said particles uniformly and intimately dispersed in said polymeric material, and removing said product from the reaction zone at a point remote from the points of entrance of said separate streams.

4. The method of preparing a composition comprising a plastic organic polymeric material containing calcium silicate dispersed therein, which method comprises admixing a dilute coagulable aqueous dispersion of said polymeric material with a dilute aqueous solution of an alkali-metal silicate, preparing a dilute aqueous solution of calcium chloride containing sufficient calcium chloride to react with said alkali-metal silicate and to insure coagulation of said dispersion, simultaneously introducing separate streams of said aqueous dispersion containing said alkali-metal silicate and said solution of calcium chloride into a reaction zone at separated points therein, the concentration of said alkali-metal silicate, said calcium chloride, and said polymeric material in said streams being sufficient to form a final aqueous slurry of from 1 to 6% by weight total solids, flowing said separate streams through said zone in contact one with the other without turbulent intermingling of same, effecting contact for the first time between said alkali-metal silicate and said calcium chloride contained in said streams during said flow by diffusional migration thereof from one stream to the other to effect precipitation of said calcium silicate in the form of particles below .05 micron in diameter, effecting contact for the first time between said polymeric material and said calcium chloride during said flow by diffusional migration thereof from one stream to the other to effect coagulation of said polymeric material about said particles to form a crumb-like product containing said particles of calcium silicate uniformly and intimately dispersed in said polymeric material, and removing said product as it is formed from said reaction zone at a point remote from the points of entrance of said separate streams.

5. The method of claim 4 wherein the coagulable aqueous dispersion of organic polymeric material is a synthetic rubber latex prepared by the copolymerization in aqueous emulsion of a mixture of butadiene-1,3 and styrene.

6. The method of claim 4 wherein the coagulable aqueous dispersion of organic polymeric material is a synthetic rubber latex prepared by the copolymerization in aqueous emulsion of a mixture of butadiene-1,3 and acrylonitrile.

7. The method of claim 4 wherein the coagulable aqueous dispersion of organic polymeric material is a latex comprising a plasticized polymer of vinyl chloride.

ROBERT T. HENSON.
GEORGE L. WHEELOCK.
LESTER H. RIGGS.

REFERENCES CITED

The following references are of record in the file of this patent:

UNITED STATES PATENTS

| Number | Name | Date |
|---|---|---|
| 1,712,333 | Dinsmore | May 7, 1929 |
| 1,953,972 | Murphy et al. | Apr. 10, 1934 |
| 1,970,469 | Murphy | Aug. 14, 1934 |
| 2,071,214 | Pestalozza | Feb. 16, 1937 |
| 2,366,460 | Lemon | Jan. 2, 1945 |
| 2,429,439 | Westfahl et al. | Oct. 21, 1947 |

FOREIGN PATENTS

| Number | Country | Date |
|---|---|---|
| 262,487 | Great Britain | Feb. 9, 1928 |

Certificate of Correction

October 18, 1949

Patent No. 2,485,287

ROBERT T. HENSON ET AL.

It is hereby certified that errors appear in the printed specification of the above numbered patent requiring correction as follows:

Column 2, line 9, for the word "organic" read *inorganic*; column 5, line 43, before "latex" insert *a*; column 7, line 63, for "where" read *were*; column 8, line 44, for "oliver" read *Oliver*; column 9, line 18, for "400%" read *400*; line 53, for "low" read *flow*; column 13, lines 50 and 51, for "volcanizate" read *vulcanizate*;

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*